United States Patent [19]
Räther

[11] Patent Number: 5,052,974
[45] Date of Patent: Oct. 1, 1991

[54] DEVICE FOR DELIVERING AND CONVEYING PASTE-LIKE SUBSTANCES

[75] Inventor: Siegfried Räther, Bad Segeberg, Fed. Rep. of Germany

[73] Assignee: Nordischer Maschinenbau Rud. Baader GmbH & Co. Kg, Lubeck, Fed. Rep. of Germany

[21] Appl. No.: 497,872

[22] Filed: Mar. 21, 1990

[30] Foreign Application Priority Data

Mar. 21, 1989 [DE] Fed. Rep. of Germany ....... 3909137

[51] Int. Cl.$^5$ .............................................. A22C 11/08
[52] U.S. Cl. .................................................... 452/41
[58] Field of Search ................... 452/40, 41; 418/177, 418/6, 172

[56] References Cited

U.S. PATENT DOCUMENTS

| | | | |
|---|---|---|---|
| 3,631,565 | 1/1972 | Muller | 452/41 |
| 3,742,556 | 7/1973 | Beasely | 452/41 |
| 3,922,755 | 12/1975 | Righele et al. | 452/41 |
| 3,930,763 | 1/1976 | Rose | 452/41 |
| 4,313,240 | 2/1982 | Richele et al. | 452/41 |

FOREIGN PATENT DOCUMENTS 8805548.5 4/1988 Fed. Rep. of Germany.

Primary Examiner—Willis Little
Attorney, Agent, or Firm—Fay, Sharpe, Beall, Fagan, Minnich & McKee

[57] ABSTRACT

In a device for delivering and conveying paste-like substances, like sausage stuffing, for the purpose of dosing or the dosed filling into sausage cases, the stuffing located in the pump chamber, based on its compressibility, is pre-compressed in order to reach a uniform substance density required for exact dosing. For the purpose of limitation of the pre-compression pressure occurring in the processing of substances of less compressibility, the bottom part and/or the cover part of the pump casing are provided with a sealing recess which enters the latter and are also supported against springs in a resilient manner.

8 Claims, 1 Drawing Sheet

DEVICE FOR DELIVERING AND CONVEYING PASTE-LIKE SUBSTANCES

BACKGROUND OF THE INVENTION

1. Field of the Invention

The invention relates to a device for the delivery of paste-like substances, particularly sausage stuffing, for producing a pulsation-free conveying flow homogeneous with respect to its density.

2. Description of the Related Art

A device of this type is known in numerous construction variations. Thus, to be taken from DE-GM 88 05 548.5, is a vane pump for the delivery of paste-like substances which comprises a conveying apparatus with a pump chamber bounded by a base or bottom part and a cover part and arranged within a casing having an inlet port or opening and an outlet port or opening. A rotor housed within the pump chamber is driven to rotate therein and has plate-shaped slides. These are guided to move in a radial direction while being kept in contact with the radial inner wall by means of their radial boundary edges over at least part of one revolution. The axial boundary edges of the slides engage in a sealingly sliding manner between the bottom part and the cover part, the slides thus including conveying cells between them. According to this structure, the conveying cells which produce the conveying pressure, are formed essentially as annular segments. This geometric form results from the rotor rotating while being mounted essentially centrally within a cylindrical casing. The separation of the inlet and outlet ports is effected by means of a wedge segment, which is inserted in a filling manner directly behind the outlet opening in the circular space between the casing and the rotor whilst sealing with respect to these elements. The corresponding control of the slides occurs by means of a stationary central cam which allows for a supporting, as well as a releasing, control of the slides.

Sausage stuffing usually has the characteristic of being compressible. At the same time, the degree of compressibility varies in accordance with the type of stuffing and can assume values of up to 10 %. Consequently, the substance admitted into the conveying cells is inhomogeneous, although the filling process is normally supplemented by the use of vacuum. This, however, has a negative effect on the dosing accuracy.

Consequently, it is usual to provide pre-compression in the region in which the conveying pressure is being built-up in order to raise the compressibility of the sausage stuffing. In the embodiment of the device according to the prior art, this is achieved through a slight eccentricity of the rotor within the casing, which eccentricity has its maximum in the region of the vane pump building-up the conveying pressure. The eccentricity is defined such that the maximum of the narrowing of the conveying cells corresponds to the greatest known compressibility of the type of stuffing to be conveyed.

If other kinds of stuffing of less compressibility are to be handled, pressure peaks results which far exceed the filling pressure and which could create a considerable burdening of the entire system which will have a severe negative influence on the wear behavior, in particular.

3. Object of the Invention

Thus, it is the principal object of the invention to overcome the drawbacks of the prior art structure by suggesting an apparatus enabling applicability for a broad variety of stuffing types.

It is a particular object of the present invention to suggest equipment for a delivery assembly such as initially described, which enables a restriction of the pre-compression pressure.

SUMMARY OF THE INVENTION

In a device for the delivery of paste-like substances, particularly sausage stuffing, for producing a pulsation-free and homogeneously sealing conveying flow, comprising a delivery apparatus with a pump chamber bounded by a base or bottom part and a cover part and arranged within a casing having an inlet port and an outlet port, a rotor within the pump chamber which is driven in a rotary manner and having plate-shaped slides which are arranged to be guided movably in radial direction and which are kept in contact with the radial inner wall by means of their radial boundary edges over at least part of one revolution and whose axial boundary edges are arranged to engage in a sealingly sliding manner between the bottom part and the cover part and thus include conveying cells between them. These objects are achieved, according to the invention, in that the bottom part and/or the cover part are arranged to be supported displaceably against a defined force, at least in the region overlapping the conveying zone between the inlet port and the outlet port. In such an arrangement, it is advantageous that the bottom part and/or cover part have a sealing recess which projects into the pump chamber.

As a result thereof, the possibility is created that the conveying cells can expand axially in the critical region, although this produces an increased leakage, which results in loss of pressure in the conveying assembly. This effect can be accepted without hesitation, however, because this merely produces a certain intensification of the, in any case, unavoidable leakage into the control center of the rotor, which establishes a connection to the effective vacuum on the opposite side. In this manner, the stuffing originating from this leakage mainly reaches the empty chambers upstream of the inlet port and is, therefore, re-captured for delivery. The simultaneously intensifying gap flow over the axial boundary edges of the slides merely causes adjacent conveying cells to communicate more intensely and, consequently, a certain equalisation of pressure within said cells takes place. The external sealing is retained due to the sealing recess.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings;

DETAILED DESCRIPTION OF THE PREFERRED EMBODIMENT

Figure 1:
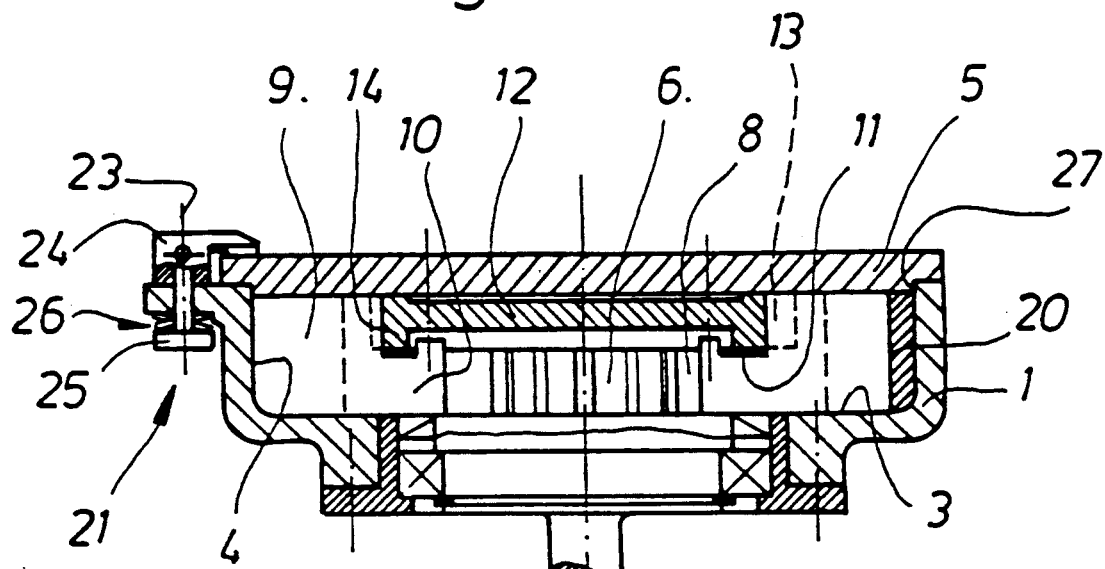
FIG. 1 shows a cross-section through the conveying and delivering assembly in simplified illustration along the line of intersection I—I in FIG. 2.
Figure 2:
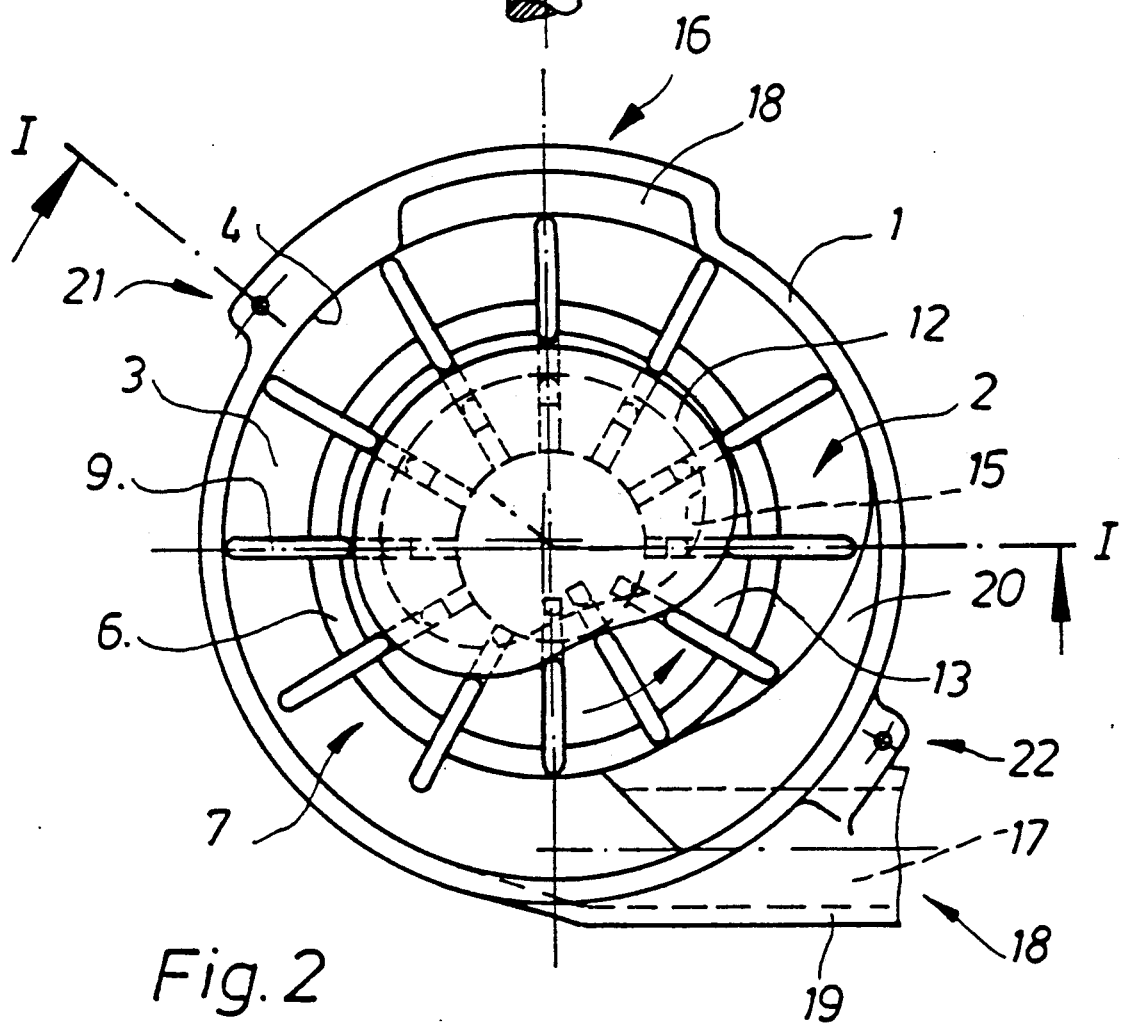
FIG. 2 is a plan view of the assembly according to FIG. 1 that is shown opened on the cover side.

A vane pump according to the present invention is e.g. a component of a not shown filling or stuffing apparatus for the producing of sausages and is driven by a not shown drive, which, preferably, can be controlled and may e.g. be a stepping motor. The vane pump comprises a pump casing 1, which surrounds a pump chamber 2 having a cup-shaped configuration with a base or bottom part 3 and a cylinder part 4 and can be closed by a cover part 5, so that a cavity is obtained in the form of a cylinder disk. A pump rotor 6 is mounted in the bottom part 3 of the pump casing 1, which rotor with an essentially cylindrical hub part 7 fills the pump chamber 2 between the cover part 5 and bottom part 3 under a close sliding fit. The hub part 7 is provided with axially extending radial slits 8, in which plate-like slides 9 are movably guided to be displaced under easy sliding fit. In the region of an offset part 10, the slides 9 are provided with a transversely extending slot 11, which is engaged by a control cam 12. The latter is arranged in a recess 13 in the pump rotor 6 facing the cover part 5 and is fixed by the cover part 5 by suitable fixing means in such a way that it does not turn. The control cam 12 is designed as a cam disk and is bounded by a cam web 14 forming the periphery which web simultaneously forms an inner cam 15. As stated hereinbefore, the controlling action or engagement on the slides 9 takes place by the engagement of the cam web 14 in its particular slot 11. The pump casing 1 has an inlet port or opening 16 and an outlet port or opening 17, which face one another roughly diametrically. The inlet port 16 is constructed as a pocket 18 in the cylinder part 4 extending substantially parallel to the axis of the rotor, and is functionally associated with a not shown hopper. The outlet port 17 is located in a connecting piece 19 fitted roughly tangentially to the pump casing 1 and penetrates a wedge segment 20 arranged in the pump casing 1, which segment snugly engages in the cylinder part 4, in the region of the outlet port 17 and in the direction of rotation of the pump rotor 6 upstream of said port.

The pump rotor 6 is mounted eccentrically in the pump casing 1, the maximum of the eccentricity in the region building up the conveying pressure lying such that the remaining circular space between the pump rotor 6 and pump casing 1 is narrowed by the dimension of the eccentricities.

Two opposing fastening elements 21 and 22, located approximately in the plane of the eccentricity, provide for the connection of the cover part 5 with the pump casing 1, which elements are formed as casement or sash fasteners to provide easy accessibility to the pump interior for cleaning purposes. These are respectively arranged in a pivoted manner around an axis 23 positioned within the pump casing 1, these axes being provided with a locking part 24 on their outwardly projecting ends to swivel over the cover part 5, and on their other end, with a collar 25 which engages under the pump casing 1. Located between the collar 25 and the pump casing 1, one set of pretensioned disk springs 26 is arranged at least on the fastening element 21 holding down the cover part 5 in the region of the compression zone.

The function of the shown device is as follows:

The material, e.g. sausage meat or stuffing stored in the not shown hopper, is pushed by suitable means installed in said hopper in the direction of its outlet port. This process is assisted in known manner by the action of vacuum, to which the pump chamber 2 is exposed. As a result of these two measures, the sausage stuffing flows into the pocket 18 of the pump casing 1 and the conveying cells are filled. The cells filled in this manner now move in the direction of the outlet port 17 as a result of the rotation of the pump rotor 6 and arrive, therefore, in the pre-compression zone which is formed as a result of the eccentric arrangement of the pump rotor 6, in which zone the volume of the conveying cells is reduced to correspond to the amount of eccentricity. If, during this process, the pre-compression which has been predetermined by the amount of eccentricity exceeds the compressibility of the sausage stuffing to be processed, the cover part 5 thus retracts and gives way against the force of the disk springs 26 so that any volume decrease of the conveying cells which exceeds beyond the compressibility does not produce an increase in pressure. The tightness of the cover part 5 with regard to the pump casing 1 is retained during this process due to the sealing recess 27 on the cover part 5, which engages in a corresponding recess in the pump casing 1.

During the further operation of the rotation of the pump rotor 6, the slides 9 are gradually retracted out of the pump chamber 2, so that the conveying cells between the slides 9 increasingly combine or unify towards the outlet port 17. Shortly before reaching the wedge segment 20, the slides 9 have retracted to such an extent that their outer radial boundary edges previously engaging on the inner wall of the cylinder part 4 are flush with the circumferential surface of the pump rotor and can penetrate under the wedge segment 20.

Thus, the sausage stuffing is moved towards the outlet port 17, particularly by the last slide 9 upstream of outlet port 17 and sealing with respect to the inner wall of cylinder part 4, and the clearly defined cavities resulting from the withdrawal of the slides 9 are filled due to the dynamic counterpressure in the discharge channel. This leads to a pulsation-free filling flow having a substantially ideal homogeneity.

What is claimed is:

1. A device for the delivery of paste-like substances for producing a pulsation-free and density-homogeneously conveying flow, the device including a conveying apparatus comprising
   a) a casing,
   b) a pump chamber surrounded by said casing, said casing defining a radially inner wall of said pump chamber,
   c) a bottom part and a cover part bounding said pump chamber by forming two axial boundary faces thereof,
   d) an inlet and an outlet, both arranged in said casing,
   e) a pump rotor mounted in said casing and driven to rotate therein about an axis of rotation,
   f) a plurality of rotor-carried plate-like slide means arranged to be guidedly displaced in said casing radially relative to said axis of rotation and provided with axial and radial boundary edges, said plurality of slide means being constructed so as to engage said bottom part and said cover part in sealingly sliding manner and, over at least part of one revolution of said pump rotor, to be kept in contact with said radially inner wall of said pump chamber, respectively, in a manner to define conveying cells between adjacent ones of said plurality of slide means, and g) means for exerting a defined force upon at least one of said bottom part and said cover part, by which force exerting means said at least one part is held displaceably supported against said force at least in a region overlapping the conveying zone formed between said inlet and said outlet.

2. A device as claimed in claim 1, wherein said at least one of said bottom part and said cover part includes means for sealing said pump chamber, said sealing means projecting into said pump chamber sufficiently to maintain an operative seal when said at least one part is displaced while being displaceably supported.

3. A device as claimed in claim 2, wherein said force exerting means includes spring means for biasing said at least one part toward a closed position.

4. A device as claimed in claim 3, wherein said inlet and said outlet are arranged to receive and deliver, respectively, the paste-like substance before and after conveyance by the conveying apparatus, respectively, and wherein the device further comprises means for recycling paste-like substance, for redelivery to said inlet, that leaks during conveyance from said inlet to said outlet.

5. A device as claimed in claim 2, wherein said inlet and said outlet are arranged to receive and deliver, respectively, the paste-like substance before and after conveyance by the conveying apparatus, respectively, and wherein the device further comprises means for recycling paste-like substance, for redelivery to said inlet, that leaks during conveyance from said inlet to said outlet.

6. A device as claimed in claim 1, wherein said inlet and said outlet are arranged to receive and deliver, respectively, the paste-like substance before and after conveyance by the conveying apparatus, respectively, and wherein the device further comprises means for recycling paste-like substance, for redelivery to said inlet, that leaks during conveyance from said inlet to said outlet.

7. A device as claimed in claim 1, wherein said force exerting means includes spring means for biasing said at least one part toward a closed position.

8. A device as claimed in claim 7, wherein said inlet and said outlet are arranged to receive and deliver, respectively, the paste-like substance before and after conveyance by the conveying apparatus, respectively, and wherein the device further comprises means for recycling paste-like substance, for redelivery to said inlet, that leaks during conveyance from said inlet to said outlet.

* * * * *